April 18, 1961    J. L. WILLIAMS    2,980,389
STOCK VALVE HAVING YIELDABLE GATE ENGAGING ELEMENTS
Original Filed April 14, 1954    2 Sheets-Sheet 1

INVENTOR.
JOHN L. WILLIAMS
BY
Buckhorn and Cheatham
ATTORNEYS

April 18, 1961 J. L. WILLIAMS 2,980,389
STOCK VALVE HAVING YIELDABLE GATE ENGAGING ELEMENTS
Original Filed April 14, 1954 2 Sheets-Sheet 2

INVENTOR.
JOHN L. WILLIAMS
BY
Buckhorn and Cheatham
ATTORNEYS

United States Patent Office 2,980,389
Patented Apr. 18, 1961

2,980,389
STOCK VALVE HAVING YIELDABLE GATE ENGAGING ELEMENTS

John L. Williams, 17467 NE. West View Road, Oswego, Oreg.

Continuation of application Ser. No. 423,114, Apr. 14, 1954. This application July 11, 1958, Ser. No. 748,030

7 Claims. (Cl. 251—175)

This invention relates to stock valves and particularly to stock valves of the type having a gate movable to and from a position between an annular seat and an arcuate backing member. This application is a continuation of my prior copending application Serial No. 423,114, filed April 14, 1954. Application Serial No. 423,114 is now abandoned in favor of the present application.

In the type of valve just mentioned, both the seat and the arcuate member are welded, or otherwise permanently secured, within a fluid passageway in the valve body and the gate is movable downwardly between the seat and arcuate member in guided relation thereto. The arcuate member is purposely made not completely annular in order to avoid collection of fibers and like matter between the lower portion thereof and the lower portion of the seat.

With the type of valve above described, a tight fit between the gate and the gate seat is not in many instances obtained because of the inability to hold close tolerances during fabrication of the valve and thus when the valve is placed in a stock line, liquid from the upstream side of the closed valve leaks around the gate and as this leakage continues fibers or other solids and semi-solids accumulate on the upstream side of the gate. As this accumulation proceeds a fiber or pulp log forms in the line making it necessary to close down operations and remove the valve from the line and clean the same.

It has been proposed to provide various types of wedges or wedge devices in such a valve so as to cam the gate tightly against the seat as the gate moves to its closed position. These wedges are expensive to manufacture and to assemble in place.

It is a main object of the present invention to provide a stock valve of the type generally indicated above, having an arcuate backing member fixed within the valve with its ends projecting slightly into the path of travel of the gate so that as the gate moves toward its closed position it will engage the projecting ends of the backing member and be forced tightly into seating engagement with the gate seat, whereby a tightly closed valve is obtained without requiring the use of expensive wedging devices.

It is a more particular object of the present invention to provide a stock valve of the type just described, wherein the backing member is secured to the valve in a manner leaving free end portions which are permanently deformed toward the gate seat and are elongated so as to have yielding qualities, whereby, when the gate is moved to its closed position it will engage these yieldable end portions and thus be firmly urged into a tight seating engagement with the gate seat.

Another object of the present invention is to provide a valve of the type just described, wherein the free end portions of the backing member are arranged to engage the gate only after the gate has moved a considerable extent toward its closed position.

Another object of the invention is to provide a novel method of constructing a valve of the present invention.

Another object of the invention is to provide a gate valve of the type under consideration having backing means, and particularly backing means in the form of an incomplete ring, providing spaced yieldable fingers specially positioned and oriented relative to a gate blade having a curved end so as to apply pressure to the blade in spaced relation to the blade tip to firmly press the blade against a valve seat with a minimum of contact between the fingers and the blade.

Various other objects of the present invention will be apparent from the following description taken in connection with the accompanying drawings wherein.

Figure 2:
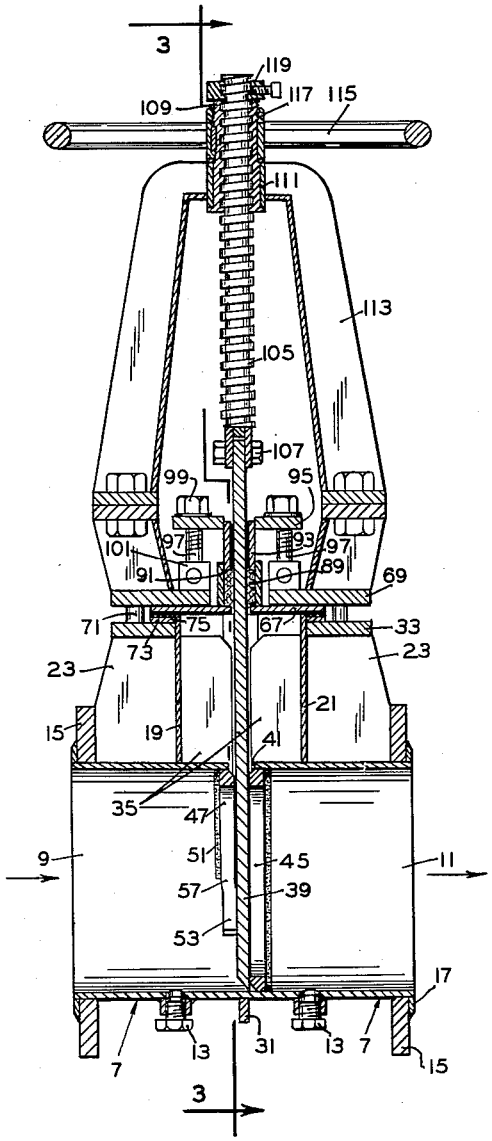
Fig. 2 is a sectional view taken along line 2—2 of Fig. 1.

Referring to the accompanying drawings wherein similar reference characters designate similar parts throughout, there is disclosed a valve embodying the concepts of the present invention, said valve including a tubular member generally indicated at 7, the left-hand portion 9 of which, see Fig. 2, constitutes an inlet member, and the right-hand portion of which constitutes an outlet member 11. The tubular member 7 thus provides a fluid passageway of uniform diameter through the valve.

A plugged purge nipple 13 is provided for each of the inlet and outlet members, each nipple being secured to the bottom of its member and communicating with the interior of such member through an opening formed in said member. Tubular member 7 is formed of corrosion resistant metal, such as stainless steel, to enable it to resist the action of acid containing paper stock.

Figure 1:
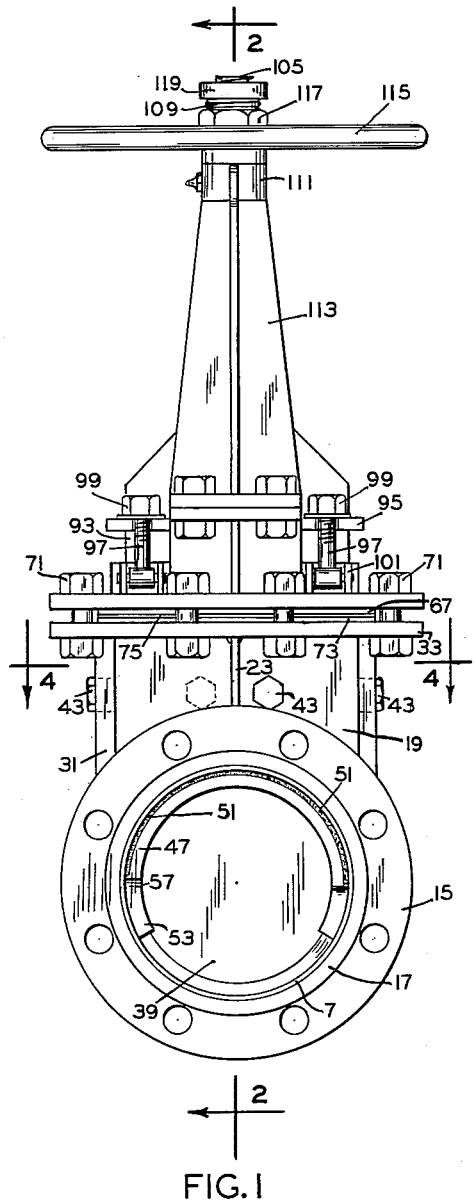
Fig. 1 is an end view of a gate valve embodying the concepts of the present invention, looking at the upstream side of the valve, the gate being shown disposed in its closed position.

Secured to each of the inlet and outlet members adjacent the outer end thereof is an annular mild steel flange 15. Secured to the outer face of each flange is a stainless steel ring 17 adapted to abut against a flange on a pipe section to which the valve is to be connected. Suitable bolt holes, see Fig. 1, are provided in each of flanges 15, to enable the flange to be secured to a pipe flange having corresponding openings.

Secured to the upper surfaces of the inlet and outlet members 9 and 11 are the lower ends of valve chest plates 19 and 21, respectively, which are generally rectangular in configuration except for having their lower ends curved to conform to the curvature of the inlet and outlet members. Connecting each of plates 19 and 21 to the associated or adjacent flange 15 is a generally rectangular plate 23, compare Figs. 1 and 4. Joining the side edges of plates 19 and 21 are rectangular side plates 25 and 27, see Fig. 4, which are secured at their lower ends to the inlet and outlet members. Plates 19, 21, 25 and 27 form a valve chest for the valve. Wear plates 29 are secured to the inner faces of plates 25 and 27, compare Figs. 3 and 4, for a purpose to appear hereinafter.

Figure 3:
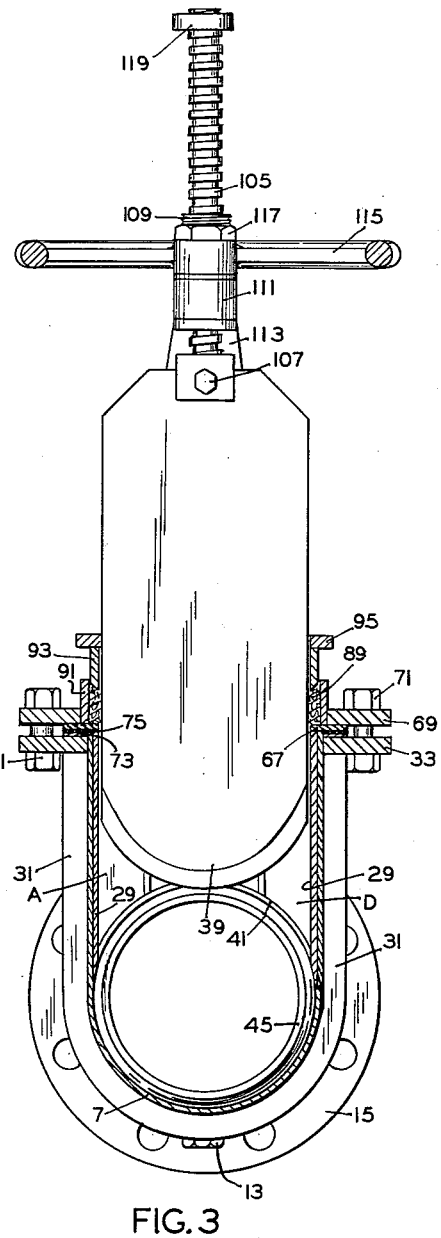
Fig. 3 is a sectional view taken along line 3—3 of Fig. 2, showing the gate in its raised open position.

A U-shaped stiffening member 31, see Fig. 3, extends around and is secured to the lower half of tubular member 7 substantially centrally between the ends of the tubular member and has its upper ends extending along and secured to the outer faces of plates 25 and 27.

Surrounding the valve chest at the upper end thereof is a rectangular loop-shaped mild steel chest flange 33 which is secured to the plates which constitute the chest, The upper ends of stiffening member 31 and the upper ends of plates 23 are secured to the lower face of flange 33. Disposed within the valve chest are two pairs of gate guide plates 35 and 37, the plates of each pair being secured at their outer edges to plates 19 and 21, respectively, and having their inner edges spaced apart a distance slightly greater than the thickness of a gate blade 39 which is supported in a manner to be presently indicated for movement between such edges. Suffice it to say, gate 39 is movable through a slot 41 formed in tubular member 7, compare Figs. 3 and 4, said slot terminating at the lower ends of wear plates 29. The valve chest plates 19, 21, 25 and 27 and the slot 41 provide a gate blade channel in which the gate blade 39 is movable.

Figure 4:
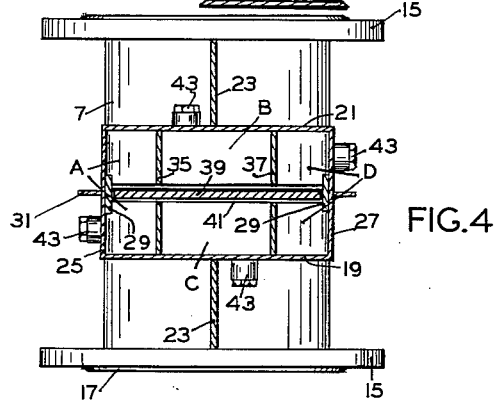
Fig. 4 is a horizontal section taken along line 4—4 of Fig. 1, more fully showing the interior of the valve chest.

By a comparison of Figs. 3 and 4, it is apparent that guide plates 35 and 37 provide four compartments within the chest, labeled A, B, C and D. It is pointed out that what is apparently two sections of compartment A in Fig. 4 is actually a single compartment including two portions in free communication with one another when the gate is elevated, see Fig. 3. The same explanation applies to compartment D. Each of the above four compartments is provided with a plugged purge nipple 43, which is secured to the chest and communicates with the compartment through an opening in the chest wall. Gate 39 has a semicircularly curved lower end, as the parts are shown in Fig. 1. This lower edge is beveled on the upstream side thereof to provide a knife edge. Gate 39 is adapted, when in its closed position, to seat against an annular gate seat 45 which fits concentrically and coaxially within outlet member 11 in a position parallel to the path of movement of gate 39 and spaced just to one side of said path to be in a position for the gate to slide closely thereby. The annular seat is welded, as shown, to the inner surface of the outlet member 11 at a place just downstream of slot 41. The annular seat preferably has its outer upstream edge beveled so as to present a beveled surface to the lower edge of the gate.

Disposed opposite to and parallel to a seat 45 is a generally C-shaped, arcuate metal backing member 47 which fits against the walls of inlet member 9 and is spaced from the seat a distance slightly greater than the thickness of gate 39. The outer downstream edge of the arcuate backing member is likewise beveled, as shown in Fig. 2, to present a beveled surface to the gate 39. The backing member has a circumferential length of greater than 180 degrees but less than 360 degrees and is oriented so that the ends thereof extend toward the semicircularly curved end of the gate blade in the closed position thereof.

As is apparent from Figs. 1 and 2, backing member 47 is welded at places spaced from its ends at 51 to the inner walls of inlet member 9 to provide free ends portions 53. The free end portions are elongated, at least when considered or viewed in a radial direction, to thus have substantial yielding qualities in the direction of fluid flow through the valve, that is, in a direction normal to the plane of the gate blade. That is, the ends have substantial yielding qualities as compared to their being welded in place. Thus there are provided yieldable yet relatively stiff spring fingers. These spring fingers are permanently bent or deformed, as at 57, toward seat 45 to an extent such as to be in part disposed closer to said seat than the thickness of the gate, see Fig. 5. The operation of these fingers will be explained hereinafter.

It is possible to weld the free ends of the arcuate backing member 47 to the walls of the inlet member 9 after they have been permanently deformed, provided the minimum space between such ends and the seat is only slightly less than the thickness of the gate. Even so, considerable galling takes place and thus this latter type of construction is to be considered only a modified form of the invention, not having all of the advantages of the form of the invention previously described.

Clamped against the upper edges of the valve chest is a stainless steel shiftable plate 67. Clamping plate 67 against the just mentioned edges is a relatively thick mild steel backing plate 69, which is free from plate 67 and is bolted to the chest flange 33 by nuts and bolts 71. Surrounding the upper portion of the valve chest is a rectangular stainless steel loop 73, which is welded to the upper face of flange 33, and between which and the outer margin of stainless steel plate 67 is clamped a rectangular gasket loop 75, compare Figs. 2 and 3.

Gate 39 extends through rectangular slots formed in plates 67 and 69 and also through a rectangular loop-shaped packing 89 surrounding the gate and supported by the inner margins of plate 67. Packing 89 is contained within a packing box 91, welded to plate 67, and is pressed downwardly and inwardly by a rectangular loop-shaped packing gland 93, which has outwardly beveled lower edges engaging the packing to force it into engagement with the gate. Welded to the upper edges of gland 93 are flanges 95 having U-shaped recesses in the outer margin thereof, compare Figs. 1 and 2, through which extend the upper ends of T-shaped swing bolts 97. Nuts 99 are threaded on the upper ends of said bolts to force the packing gland downwardly, suitable lock washers being furnished thereunder. The heads of the bolts are pivoted in pairs of lugs 101 fixed to plate 67.

It is apparent that when bolts and nuts 71, previously mentioned, are loosened, the packing gland assembly, including plate 67, box 91, gland 93 and packing 89, may be slightly shifted relative to the valve chest to enable gate 39 to center itself relative to seat 45 and backing member 47. Thereafter, nuts and bolts 71 are tightened and a centered relation of the gate and seat and backing members is maintained. The construction of the packing gland assembly is covered in my application Serial No. 248,030, filed September 24, 1951, now Patent No. 2,720,-379. Application Serial No. 248,030 was copending with my application Serial No. 423,114. The subject application is a continuation of my application Serial No. 423,114.

Gate 39 is shown in its closed position in Fig. 2 and is adapted to be elevated by a screw 105, which has a clevised lower end connected by a bolt and nut 107 to the upper portion of gate 39. The screw is threadedly received adjacent its upper end by a sleeve-type nut 109, which is rotatably mounted in a sleeve 111. Sleeve 111 is fixed to and between the upper ends of a pair of arms 113, the lower ends of which are secured, such as by welding, to plate 69. The arms are T-shaped in cross-section, as is apparent by a comparison of Figs. 1 and 2.

Nut 109 has a bottom flange engaging the lower end of sleeve 111, see Fig. 2, and has keyed thereto, above sleeve 111, a hand wheel 115. A nut 117 is threaded on the upper end of nut 109 to retain the hand wheel in place. A stop nut 119 is threaded on the upper end of screw 105 and held in a fixed position by a set screw, as shown. The stop nut is operable to engage the upper end of sleeve type nut 109 just prior to the time that the lower edge of gate 39 would engage the lower walls of the fluid passageway in the valve body. Thus damage to the sharp lower edge of the gate is avoided.

Figure 6:
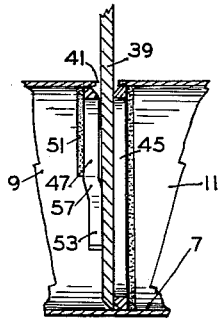
Figs. 5 and 6 are diagrammatic views showing the action of the ends of the backing member as the gate moves toward its closed position.
Figure 5:
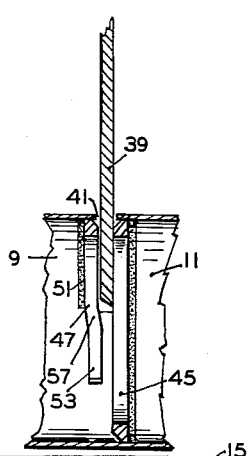

Referring to Figs. 5 and 6, in operation, the hand wheel is rotated in the appropriate direction to cause the gate 39 to descend, the gate moving along the upstream face of seat 45, pushing whatever debris or solid matter which collects or accumulates between the backing member and the seat downwardly toward the opening between the ends of the backing member. As the gate engages the yieldable fingers of the backing member, see Fig. 5, it is pressed into tight engagement with the seat member. Because the end portions 53 of the backing member are disposed below the horizontal diameter of the tubular member 7, see Fig. 3, and because the lower end of the gate is rounded, the gate will engage the end portions or fingers 53 only after said gate has moved a considerable extent toward its closed position. Thus the gate may be relatively freely moved toward its closed position for a major portion of such closing movement.

It is pointed out that the welded intermediate portion of the backing member is only slightly spaced from the gate blade and thus such intermediate portion functions to prevent the gate blade when it is closed from being bent by the forces of back pressure.

It is evident that when the gate is in its closed position and held tightly seated by fingers 53, water or liquid cannot leak past the gate by seeping between the gate and the seat of the seat member. By virtue of such tight seating engagement, there is assurance that there will be no dehydration of stock and thus no formation of fiber logs in the line.

Reverse rotion of the hand wheel will raise the gate 39 to its elevated position shown in Fig. 3. It is pointed out that because the backing member does not extend downwardly opposite the bottom portion of seat member 45, there will be no collection of solids or debris at the upstream side of the bottom portion of the seat member.

It is desirable at certain intervals to purge or clean the valve chest of the solid material or any debris collecting therein. This is readily accomplished with the valve remaining in the line by elevating the gate to the Fig. 3 position, unplugging chest nipples 43, and the nipples 13 in the tubular member 7, and running clean water into nipples 43 and flushing the debris out through the lower nipples 13. Of course, valves upstream and downstream of the valve being cleaned are closed to isolate the valve being purged.

By the present invention, a paper stock valve has been provided having a simple and inexpensive backing member so secured in place and deformed as to furnish yieldable fingers for engaging the gate as the gate descends, to cause the gate to form a tight seat against the gate seat of the valve. This tight seating is obtained without the necessity of wedging devices previously employed. It is apparent that the present invention has also provided an arrangement whereby the stuffing box for the gate may be shifted to enable the gate to correctly seat against the gate seat and move between the gate seat and the backing member. Furthermore, a simple purge arrangement has been provided which enables the valve chest to be cleaned or purged with a minimum amount of shut-down time and with the valve remaining in the line. Also, by the provision of the stop nut 119, the gate 39 is stopped in a position with its lower edge spaced slightly from the lower walls of the fluid passageway through the valve.

Having described the invention in what is considered to be the preferred embodiment thereof, it is desired that it be understood that the invention is not to be limited by the specific details shown, unless such details constitute critical features of the present invention, all of which will be apparent by reference to the following claims.

I claim:

1. A gate valve comprising a valve body having inlet and outlet portions having curved walls of circular cross section defining a flow passage, said valve body providing a gate blade slot between said inlet and outlet portions, a gate blade having a semi-circular end projecting through said slot, a seat for said blade on said outlet portion, a backing member for said blade disposed on the side thereof remote from said seat, said backing member consisting solely of an incomplete ring having an external diameter the same as the internal diameter of said inlet portion, said backing member being disposed in nesting relation within the curved walls of said inlet portion with the central part of said backing member next to the central part of said slot and the end portions of said backing member disposed symmetrically one on either side of the center line of said blade to be laterally spaced relative to the tip of said blade, said backing member being connected by a weld at its outer arcuate edge to the curved walls of said inlet portion in spaced relation to said end portions so that said end portions provide yieldable backing fingers, said fingers extending generally in the direction of closing movement of said blade and projecting toward said outlet portion to engage said blade and push it against said seat, said fingers also being longitudinally spaced from such said blade tip in the closed position of the latter, so that said fingers apply pressure against said blade along a transverse region longitudinally spaced toward the central portion of the passage from the closed position of said blade tip, the curvature of said blade end providing for initial engagement between said fingers and the side marginal portions of said blade just before said blade is fully closed and separation of said fingers and blade just after said blade commences its opening movement, despite the longitudinal spacing of said fingers from said blade tip closed position.

2. A gate valve as described in claim 1 in which the portions of said incomplete ring which are connected by a weld to said inlet body portion project into the flow passage not substantially farther than said valve seat so that because of this and the conforming, nesting relationship of the incomplete ring within said inlet body portion, the incomplete ring does not materially interfere with the flow of fluid through said flow passage.

3. A gate valve comprising a valve body having a flow passage and a gate blade slot in the walls of said passage, a gate blade having a semicircular end projecting through said slot, a seat for said blade, backing means for said blade disposed on the side thereof remote from said seat, said backing means including two yieldable fingers disposed symmetrically one on either side of the center line of said blade and near the side edges of said blade so as to be laterally spaced relative to the tip of said blade, said fingers extending generally in the direction of closing movement of said blade, and projecting toward said seat to engage said blade and push it against said seat, said fingers also being longitudinally spaced in the direction of opening movement of said blade from the tip of said blade when said blade is closed so that said fingers apply pressure against said blade along a transverse region longitudinally spaced toward the central portion of the passage from said blade tip in the closed position of the blade, the curvature of said blade end providing for initial engagement between said fingers and the side marginal portions of said blade end just before said blade is fully closed and separation of said fingers and blade end just after said balde commences its opening movement, despite the longitudinal spacing of said fingers from said blade tip in the closed position of the latter.

4. A gate valve as described in claim 3 in which there are means for securing said backing means to said valve body, said securing means being directly accessible through said flow passage so that securement of said backing means to said valve body may be accomplished after said valve body is assembled, said backing member being of a size to pass through the flow passage to enable the backing member to be mounted in place after the valve body is assembled.

5. A gate valve comprising a valve body having inlet and outlet portions having curved walls of circular cross section defining a flow passage, said valve body providing a gate blade slot between said inlet and outlet portions, a gate blade having a semicircular end projecting through said slot, a seat for said blade on said outlet portion, a backing member for said blade disposed on the side thereof remote from said seat, said backing member being in the form of an incomplete ring having an external diameter the same as the internal diameter of said inlet portion, said backing member being arranged in nesting relation within the curved walls of said inlet portion with the central part of said backing member next to the central part of said slot and the end portions of said backing member disposed symmetrically one on either side of the center line of said blade to be laterally spaced relative to the tip of said blade, said backing member being secured to the curved walls fo said inlet portion in spaced relation to said end portions so that said end portions provide yieldable backing fingers, said fingers extending generally in the direction of closing movement of said blade and projecting toward said outlet portion to engage said blade and push it against said seat, said fingers also being longitudinally spaced from such said blade tip in the closed position of the latter, so that said fingers apply pressure against said blade along a transverse region longitudinally spaced toward the central portion of the passage from the closed position of said blade tip, the curvature of said blade end providing for initial engagement between said fingers and the side marginal portions of said blade just before said blade is fully closed and separation of said fingers and blade just after said blade commences its opening movement, despite the longitudinal spacing of said fingers from said blade tip closed position.

6. A gate valve comprising a valve body having inlet and outlet portions having curved walls of circular cross section defining a flow passage, said valve body providing a gate blade slot between said inlet and outlet portions, a gate blade having a semicircular end projecting through said slot, a seat for said blade on said outlet portion, a backing member for said blade disposed on the side thereof remote from said seat, said backing member being in the form of an incomplete ring having an external diameter the same as the internal diameter of said inlet portion, said backing member being arranged in nesting relation within the curved walls of said inlet portion with the central part of said backing member next to the central part of said slot and the end portions of said backing member disposed symmetrically one on either side of the center line of said blade to be laterally spaced relative to the tip of said blade, said backing member being welded at its outer arcuate edge to the curved walls of said inlet portion in spaced relation to said end portions so that said end portions provide yieldable backing fingers, said fingers extending generally in the direction of closing movement of said blade and projecting toward said outlet portion to engage said blade and push it against said seat, said fingers also being longitudinally spaced from such said blade tip in the closed position of the latter, so that said fingers apply pressure against said blade along a transverse region longitudinally spaced toward the central portion of the passage from the closed position of said blade tip, the curvature of said blade end providing for initial engagement between said fingers and the side marginal portions of said blade just before said blade is fully closed and separation of said fingers and blade just after said blade commences its opening movement, despite the longitudinal spacing of said fingers from said blade tip closed position, the portions of the backing member which are connected by a weld to the inlet portion of the valve body projecting into the flow passage so that they are directly accessible through said flow passage so that welding may be applied after the valve is assembled, said backing member being of a size to be passed through the inlet portion to enable the backing member to be mounted in place after the valve body is assembled.

7. The method of providing backing means against a gate blade to hold the blade against a seat, wherein said blade intersects a flow passageway of circular cross section, said method comprising providing a partial ring of a size to be passed into said flow passageway and having an outer diameter the same as the diameter of said passageway, passing said partial ring into said flow passageway and positioning said partial ring in nesting relation in said passageway next to the path of movement of said blade with the plane of said ring being disposed perpendicularly to the axis of said passageway and with the ends of said ring pointing in the general direction of movement of said blade and symmetrically disposed relative to said blade, welding the ring at its outer arcuate edge to said passageway and terminating said welding operation short of the ends of said ring to leave free finger portions, thereafter permanently deforming said finger portions in the direction of the path of movement of said blade and into said path so that such ends engage said blade and press the blade against said seat.

References Cited in the file of this patent

UNITED STATES PATENTS

| | | |
|---|---|---|
| 601,923 | Williams | Apr. 5, 1898 |
| 1,054,150 | Thorsby | Feb. 25, 1913 |
| 1,938,505 | Trice | Dec. 5, 1933 |
| 2,550,984 | Ferguson | May 1, 1951 |
| 2,842,283 | Smith | July 8, 1958 |
| 2,873,943 | Williams | Feb. 17, 1959 |

FOREIGN PATENTS

| | | |
|---|---|---|
| 34,281 | Denmark | Mar. 6, 1925 |